United States Patent [19]

Chapin David S.

[11] Patent Number: 5,001,843
[45] Date of Patent: Mar. 26, 1991

[54] CARPENTER'S TAPE MACHINE

[76] Inventor: Chapin David S., 1201 Park Dr., Raleigh, N.C. 27622

[21] Appl. No.: 370,975

[22] Filed: Jun. 23, 1989

[51] Int. Cl.⁵ .................. B65H 75/48; G01B 3/10
[52] U.S. Cl. .................. 33/767; 242/107.2; 242/848
[58] Field of Search .......... 33/767, 769; 242/107.2, 242/107.3, 84.8, 107.15

[56] References Cited

U.S. PATENT DOCUMENTS

| | | | |
|---|---|---|---|
| 2,814,881 | 12/1957 | Ljungberg | 33/767 |
| 3,435,529 | 4/1969 | Quenot | 33/767 |
| 3,482,798 | 12/1969 | Kawaguchi | 242/107.3 |
| 3,534,478 | 10/1970 | Fisher | 33/767 |
| 3,577,641 | 5/1971 | Smith | 33/767 |
| 3,816,925 | 6/1974 | Hogan et al. | 33/767 |
| 4,131,244 | 12/1978 | Quenot | 33/767 |
| 4,194,703 | 3/1980 | Roe | 33/767 |
| 4,205,448 | 6/1980 | Asai | 33/767 |
| 4,651,429 | 3/1987 | Ljungberg et al. | 33/767 |
| 4,938,430 | 7/1990 | Chapin | 242/107.2 |

FOREIGN PATENT DOCUMENTS

| | | | |
|---|---|---|---|
| 2100307 | 7/1978 | Fed. Rep. of Germany | 33/767 |
| 0253421 | 6/1926 | United Kingdom | 33/767 |

Primary Examiner—Thomas B. Will
Attorney, Agent, or Firm—Kenyon & Kenyon

[57] ABSTRACT

A carpenter's tape measure having a unique arcuate section and a tape locking device. The position of the lock device and the arcuate section provides for more convenient operation of the tape and lock than is possible with other tapes.

23 Claims, 4 Drawing Sheets

CARPENTER'S TAPE MACHINE

BACKGROUND AND DISCUSSION OF THE INVENTION

The present invention relates to tape measures, more particularly the present invention relates to tape measure locking systems.

Carpenter's tape measures are commonly used devices which typically incorporate a spring-loaded rolled metal or plastic tape into a housing. To use the tape, the end of the tape or blade, which protrudes from the housing, is pulled to the desired length and the measurement is taken. The tape measure may include a locking means, such as a toggle lock, for locking the tape at a set length to enable repeat measurements.

After all measurements are taken, the tape is permitted to retract into the housing. By releasing the locking mechanism, the spring motor within the housing acts on the rolled tape to effect its retraction.

There are a number of problems associated with existing tape measures, ranging from poor ergonomics to insufficient operation. These tape measures are often large, bulky devices, heavy and difficult to hold and operate. The locking mechanisms are inadequate because of susceptibility to wear and the expense of manufacture. Moreover, the position of the button for actuating the mechanism is often difficult to reach, detracting from ease of operation.

The weight and size have been, to a large extent, a function of certain design criteria imposed by the marketplace. A standard blade length of twenty-five feet has evolved, and the weight of the tape blade plus the amount of spring or other retractions means required to retract the tape blade can add up to almost a pound of material. These two components are often contained in a two-piece housing, generally orthogonal in configuration, and screwed together by at lease four screws equally spaced about the housing perimeter. This housing and other components provide the necessary rigidity to enable the tape to meet various use requirements, including passing certain "drop" tests. Since the housing was sized to accommodate the type, spring, locking elements, and the other parts, and to withstand the tests, in addition to being heavy, it is relatively large.

Two popular types of locks currently used include variations of a "knuckle joint" lock that works on the same principle as the knuckle in the finger, which is longer when straight than it is when it is bent. In addition, the joints in the fingers can flex slightly beyond straight (over-center), so that an increased compression force on the finger when the finger is "locked" (fully extended) causes the finger to stiffen in the straight position rather than to flex.

If one tries to incorporate either version of a knuckle joint lock into the tape case of the present invention, several problems are encountered. One problem is due to the fact that the overall size of the tape measure housing is determined, in part, by the size of the base which three inches is a convenient size for the hand of most users and it also avoids requiring the user to add fractional numbers if an inside dimension is measured. Another housing design problem results from the need for positioning the button for the tape locking mechanism in the upper forward quadrant of the tape case. This position is required to give the user easy access to the button with an index finger.

To use a "knuckle" type tape locking mechanism, there should be a path which is free of encumbrances or protuberances from the point at which the tape is locked in the bottom of the housing to the point in the upper forward quadrant of the tape case at which the button or other actuating mechanism pivots.

Tape locking systems, in general, employ a number of distinct elements, be they "knuckle" type locking systems or other type locking systems. Such distinct elements are the piece which attaches to the locking button and the locking shoe. These distinct elements present certain problems in the manufacture and long-term use of tape measures. Such distinct elements also make the tape locking systems quite sensitive to slight variations in the lengths of the two pieces which form the tape measure lock. If the length of either one of the pieces changes, due to variations in the molding process, wear on the bottom of the locking shoe, or other factors, the lock will quickly cease to be effective. This problem is aggravated by the placement of the lock button more distant from the locking point than is the case with prior tape measures. Thus, where the locking means are longer than normal, the possibility is increased that a small variation in the length of the locking shoe will affect the locking system enough to render it useless or reduce its effectiveness.

Similar problems are associated with the length of travel for the locking mechanism. Vertical travel is defined herein as the distance between the end of the locking shoe in the locked and unlocked positions. Inadequate vertical travel of the locking shoe can adversely affect retraction of the tape as the tape motor may not be able to overcome the friction remaining on the tape blade left by inadequate retraction of the locking shoe. For example, as the blade is extended, the amount of coiled tape blade left on the tape reel decreases. This changes the angle at which the tape blade reel approaches the mouth of the tape measure and consequently causes the locking shoe to rub on the tape blade. This rubbing is caused by the locking shoe not being moved a sufficient vertical distance from the tape measure to avoid interference with the tape. Rubbing slows the retraction of the tape. Rubbing necessitates a longer, stronger spring motor to overcome the frictional forces applied to the tape blade by the locking shoe. Hence, the absence of sufficient vertical travel may require the tape measure to be heavier and larger.

In some instances, the travel of the locking shoe is not strictly vertical or perpendicular to the path of tape travel; specifically, there is often a horizontal or parallel component to the locking shoe's motion at the end of its travel. This horizontal component tends to change the horizontal position of the blade, and hence changes the resultant measurement which defeats the essential purpose of having a tape measure.

Other problems with prior art tape measure locking systems are associated with the location and operation of the actuating mechanism. A horizontal push—toggle lock mechanism placed on the forward wall of the tape (just above the mouth where the tape blade exists the case) requires that the user either grip the tape extremely tightly or put one or two fingers behind the rear wall of the tape to prevent the tape from being pushed out of the hand. Placing one or two fingers behind the rear wall of the tape is awkward and uncomfortable. When the fingers are in this position, one locks or unlocks the tape by pressing the thumb toward the little finger. This is an awkward motion, and one in which the hand cannot exert much strength.

Accordingly, a need remains in the art, to provide a locking mechanism, which accurately locks a tape in position and is easily and comfortably used.

SUMMARY OF THE INVENTION

The tape measure locking system of the present invention and invention described herein accurately locks a tape and is comfortably used through a unique configuration and arrangement of elements. Sufficient strength can be achieved with three screws to hold the housing parts together rather than the four noted above. By using three screws and forming a portion of the housing in arcuate fashion, a portion of the perimeter wall of the tape measure can "hug" the drum shell that holds the tape blade and springs quite closely. This configuration reduces the size of the tape measure case and permits the tape measure to fit quite nicely into the palm of the hand.

The awkwardness in holding prior art tape measures is in part overcome by placement of a toggle lock-type locking button on the upper face of the tape case. The toggle lock in this position takes advantage of the both the natural position of the thumb when a toggle lock is used and the relative ease with which the toggle lock is engaged and disengaged. In the present invention, the lock button is located relatively high on the tape measure and is angled upward to alleviate the need to place one or two fingers behind the rear wall of the tape measure housing. This configuration also permits an actuating motion to occur between the thumb and forefinger rather than between the thumb and little finger (a position where the hand can exert quite a bit of pressure).

The actual locking system of the present invention utilizes a mechanism which overcomes problems with excessive travel and the adverse effects of wear associated with some prior art action mechanisms. A one-piece locking mechanism with "living hinges" can accommodate substantial travel and avoid the vexatious problem of locking shoe wear. This one-piece mechanism includes three (3) sections connected by plastic hinges which flex in a hinge-like fashion. The three sections include an upper section connected to the actuating mechanism, a lower section for engaging the tape, and a middle section hinged at each end between the upper and lower sections. Pins extending from the upper and lower sections cooperate with their respective slots in the case walls to constrain travel of the sections in a preselected path.

This configuration permits the locking shoe to be readily displaced upwardly out of engagement with the tape. The middle section (in the unlocked position) is arranged to permit movement or pivoting about the hinges, particularly the movement of the hinge connecting the section to upper section. When moved in a locked position, the middle section and the hinges are arranged in a near vertical position such that upward movement of the locking shoe is constrained. Any force exerted on the locking mechanism by the blade tends to force the locking mechanism further into the locked position. As a result, the system is moved to a locked position and it tends to stay locked.

The new locking system of the present invention provides an added advantage in that it is easy to assemble, having only one piece, rather than two found in many prior art devices. This one piece construction is important because of the complexity of a tape measure and the market driven forces which tend to make the industry extremely cost-sensitive. Moreover, with a reduction in complexity there is less chance for error on the part of the assembler. In addition, this locking system is cheaper to produce, because it is only one piece; thus the necessity of a second mold and separate inventory connected with the second piece is eliminated. The locking system of the present invention is significant, because it can be installed in limited space similar to that in existing tapes, with only minor modifications.

BRIEF DESCRIPTION OF THE DRAWINGS

A better understanding of the locking mechanism of the present invention may be had by the reference to the drawings, wherein.

DETAILED DESCRIPTION OF THE EMBODIMENTS

As shown in FIGS. 1-5, the locking system of the present invention as illustrated by the preferred embodiment includes a locking mechanism to which is contained in a housing, a portion of which is arcuate in configuration. For the purposes of this description, the housing is divided into quadrants to describe the location of various elements.

Figure 1:
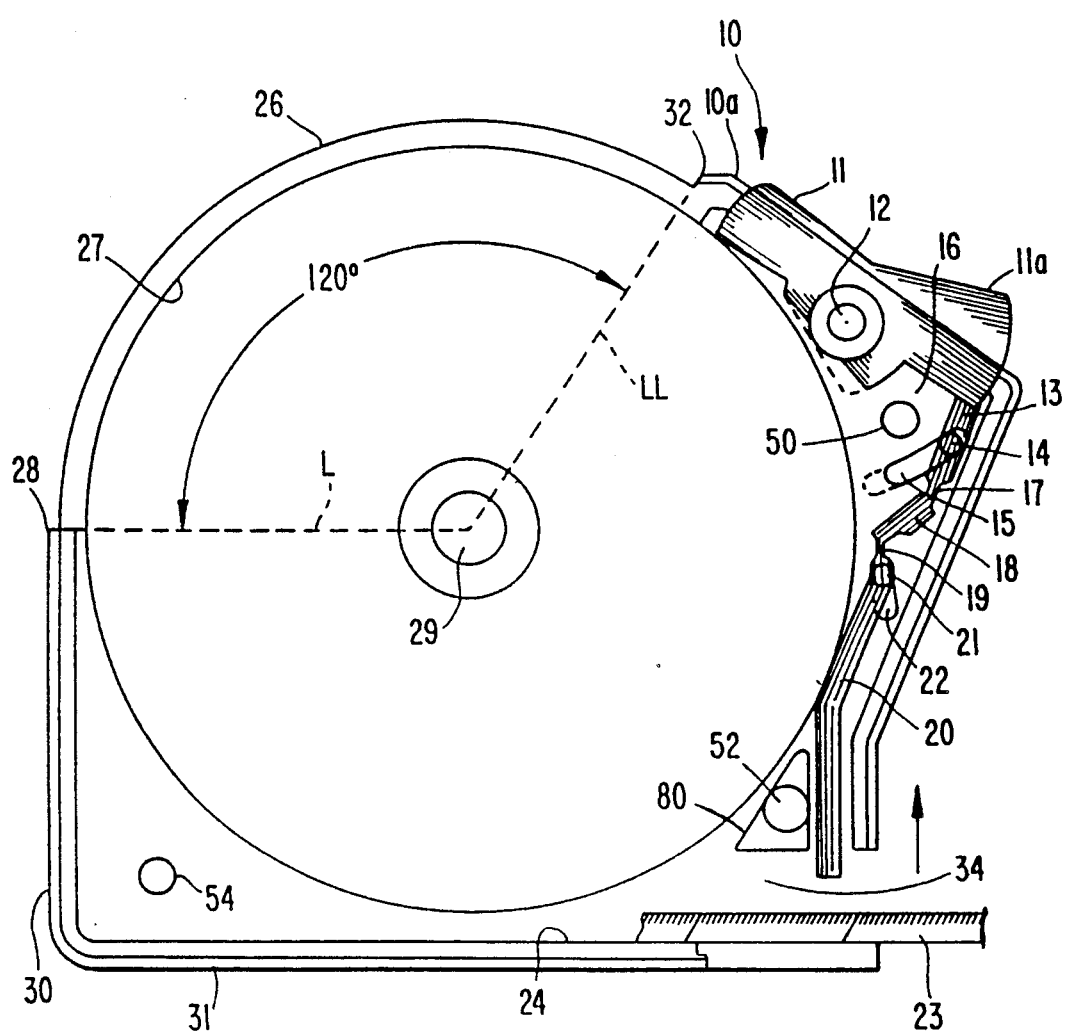
FIG. 1 shows a side view of the invention in an unlocked position.
Figure 2:
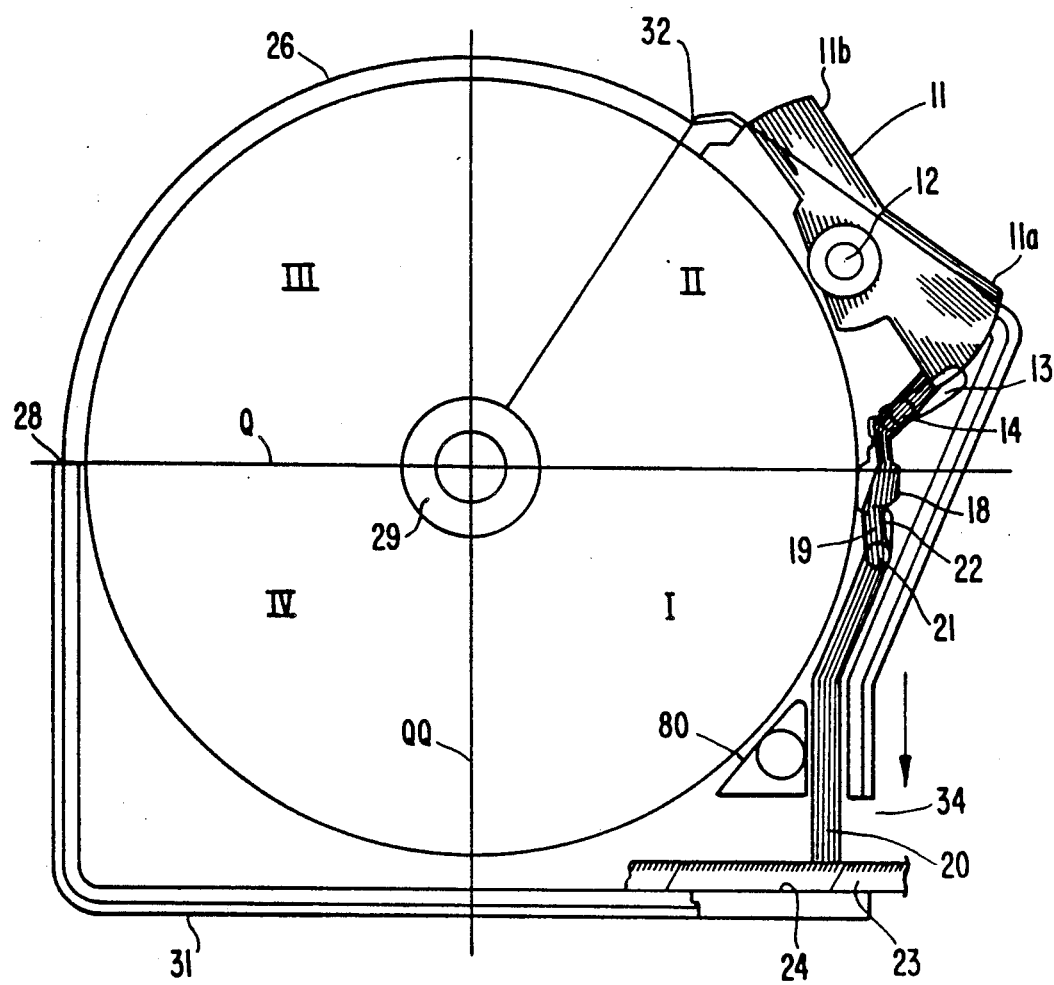
FIG. 2 shows a side view of the invention in a locked position.

The lock of the present invention is a one piece system having several connected sections. These sections include a top section, generally 10 which consists of a button 11, button pivot 12 and button extension 13. The button pivot 12 extends through the button 11 and the housing walls 16 as illustrated, permitting the button to pivot thereabout. The portion of the button through which the pivot 12 passes may completely encase the pivot 12 as illustrated in FIG. 1, or only partially encase the pivot, as illustrated in FIG. 2.

The button extension preferably has two posts or pins 14 that protrude from the edges of the extension 13 and travel in slots 15 in the tape measure's housing walls 16.

Connected to the end of the extension 13 distal from the button 11 is a top "living hinge" 17, which pivotally connects one end of a middle section 18 to the extension 13. A "living hinge" is a creation of plastics technology, which utilizes the principle that a sufficiently strong piece of plastic, such as polyproplene, if made sufficiently thin, (for example 0.0010–0.0020" thick), can flex in hinge-like fashion up to a million times or more before failing.

Middle section 18, in turn, is preferably connected at its other end to a lower living hinge 19. The lower living hinge 19, in turn, pivotally connects the middle section 18 to a lock shoe 20. The lock shoe 20 preferably has two posts or pins 21 on its upper edges that protrude from the edges of the shoe and travel in slots 22 in the case walls 16.

To achieve the desired motion, extension 13, section 18 and shoe 20 are specifically configured with pins 14 and 21 to cooperate with slots 15 and 22 to lock the tape 23 when properly actuated. The following is a more detailed discussion of this arrangement.

Figure 3:
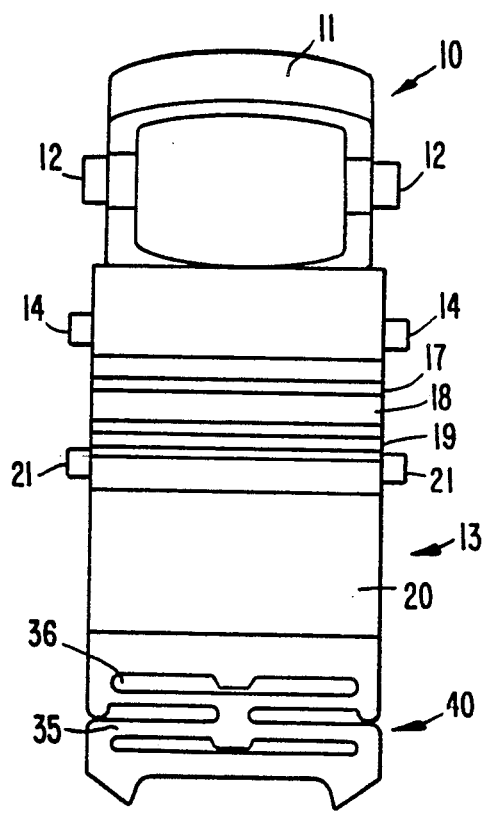
FIG. 3 shows a rear view of a lock button.

As can be seen in FIG. 3, extension 13 has two pins 14 extending from its sides for engagement with opposed slots 15 in the sidewalls. Similarly, two pins 21 extend from lock shoe 20 into opposed slots 22 also in the sidewalls. These slots, 15 and 22, have a width dimension slightly greater than the effective diameter of pins 14 and 21. This ensures a well defined path of movement during the locking and unlocking operation. The middle section has no pins and moves relative to extension 13 and lock shoe 20 as a function of their location with respect to the slots.

Slots 15 are concentric with the center of the button pivot. Slots 22 extend generally vertically and define longitudinal axes that extend through the slots 15 as shown. The slots 15 and 22 have a length to permit locking and unlocking of the tape blade 23 as described below.

Figure 4:
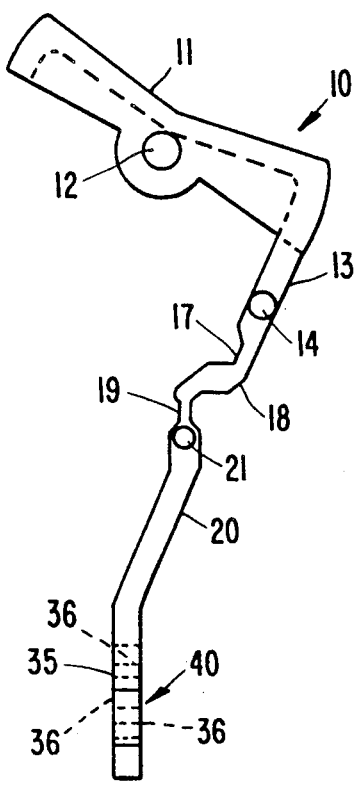
FIG. 4 shows a side view of the button shown in FIG. 3.

In the unlocked position as shown in FIGS. 1 and 4, middle section 18 is permitted to pivot about hinge 17 due to the torque or moment imposed by upward movement of button 11 which pulls sections 18 and 20 upwardly, away from the tape blade 23. This allows sufficient displacement of the lock shoe so as to permit extension and retraction of tape blade 23. In this position relatively slight upward pressure on lock shoe 20 will cause the middle section to pivot about hinge 17 in a clockwise direction allowing the requisite movement of shoe 20.

On the other hand, in a locked position, pins 14 and 21 interact with slots 15 and 22 to limit movement of middle section 18. When in the locked position, pins 14 engage or are adjacent to end of slot 15 farthest from button 11. Similarly, pins 21 engage or are adjacent remote ends of slots 22. As can be seen in FIG. 2, in this locked position pins 14 and 21 are colinear along a generally vertical line. Middle section 18 is vertical or slightly to the left of vertical as shown. When middle section 18 is closer to the drum center 29 than the line drawn between hinge 19 and pivot 12, then the tape is locked. When it it further away from the drum shell center 29 than the line connecting hinge 19 and pivot 12, the tape is unlocked.

With this arrangement, in the locked position, upward forces on the lock shoe create a torque or moment on section 18 about hinge 17 in the counter-clockwise direction. Since pins 14 are at the end of slots 15, and pins 21 are constrained from movement by the vertical slots, no such movement to an unlocked position can occur. Rather, the elements are simply compressed, such that the greater the upward force the greater the compressions tending to oppose upward movement.

Guide boss 80 extends from the walls of housing 30 adjacent the lower portion of lock shoe 2. This arrangement limits lateral movement of the lock shoe and guides the lock shoe 20 movement during actuation.

In use, the button 11 pivots around the button pivot 12. Button pivot 12 is a shaft that extends from button 11 into journals formed in the case wall 16. Those of ordinary skill in the art will understand that alternatively the shaft may extend from case wall 16 and the hole may be placed in button 11. The lock shoe 20 travels vertically as indicated by the arrows in FIGS. 1 and 2. The lock shoe's motion is constrained by slots 15 and 22 and two opposing case walls at the lower portion of the lock shoe 20. As shown, the lock shoe 20 is configured to fit within the tape housing 30, by providing appropriate bends at appropriate points.

As the front edge 11a of the button 11 is depressed, the middle section 18 is forced from a forwardly leaning position as illustrated in FIG. 1 into a more vertically oriented position as illustrated in FIG. 2 by the interaction of the slots 15 and 22 in the case walls and the posts or pins 14 and 21, respectively, on the one-piece lock. This transition forces the lock shoe 20 downwardly, where it contacts the blade 23, trapping the blade 23 between the lock shoe 20 and the case wall 24 beneath blade 23. As seen in FIGS. 1 and 2, the slots 22 are substantially vertical and perpendicular to the tape blade 23. This vertical orientation of slots 22 substantially prevents or eliminates the horizontal component of the lock shoe 20 travel encountered in prior devices.

Figure 5:
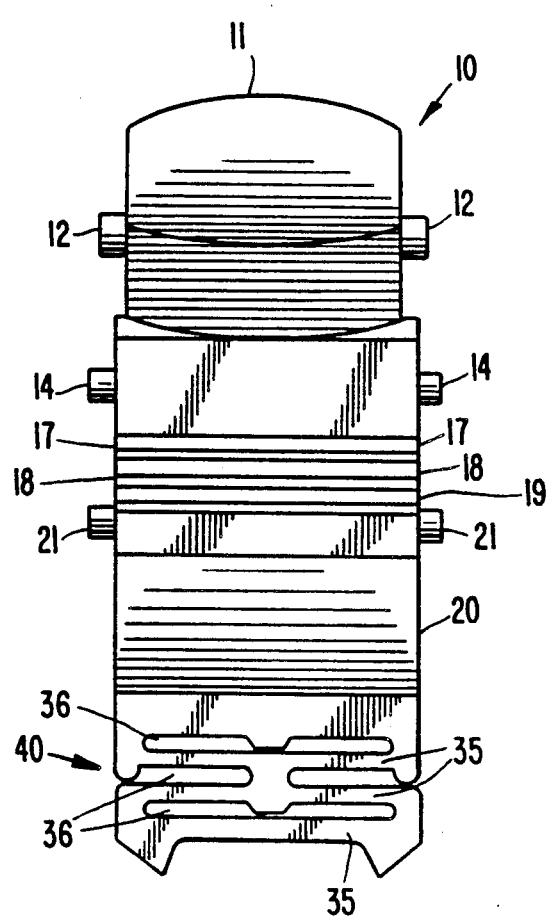
FIG. 5 shows a front view of the button shown in FIG. 1.

As further illustrated in FIGS. 3 and 5, the lock shoe 20 may include a compressibility means, generally 40, which compresses as the shoe is being pressed into locking engagement with the tape blade 23. The compressibility means preferably comprises one or more ribs 35 with openings 36 spaced therebetween. The nature of the plastic material permits flexion of the ribs in the locked position. The compressibility means assists in compensating for minor variations in shoe length, tape blade thickness or wear.

As illustrated in FIG. 2, the tape measure of a preferred embodiment of the present invention can be divided in to for quadrants, 1-IV. As shown, housing 30 of the tape measure has a lower forward quadrant I, an upper forward quadrant II, an upper rear quadrant III, positioned rearwardly of the upper forward quadrant II, and a lower rear quadrant IV positioned directly below the upper quadrant III. As illustrated, these four quadrants are defined by two intersecting imaginary lines Q and QQ. Line Q is established by drawing a line through the center axis 29 of the drum shell 27 which line Q is substantially parallel to the flat base portion 31 of the housing. The second imaginary line QQ is established by drawing a line through the center axis 29 of the drum shell 27, which line QQ is substantially perpendicular to the flat base portion 31 of the housing 30. As illustrated in FIG. 2, the tape 23 is withdrawn from an opening 34 in the housing 30, which opening 34 is in quadrant I.

As illustrated in FIGS. 1 and 2, the housing 30 of the present invention has an arcuate portion 26 comprising an arc of a circle, located in the upper rear quadrant of the tape measure. Arcuate portion 26 is adapted to be concentric with the drum shell 27, which resides rotatably within the tape housing 30 and holds the tape blade 23 and blade retraction spring. The drum shell 27 is essentially a spool which is adapted to enable a tape blade 23 to be wrapped around and stored on the spool, and be dispensed when required for use. When the tape 23 is needed for a measurement, the end of the tape 23 is simply pulled out of the housing 30, thereby unwrapping the tape roll. A retraction means, such as a spring, rewinds the drum shell and thus recoils the tape blade when the user releases the tape blade.

Additionally, the arcuate portion is designed to be as close to the drum shell 27 as possible, without interfering significantly with the drum shell's operation. The arcuate portion 26, as illustrated, preferably extends from a point 28 formed by the interaction of an imaginary line L drawn from the center axis 29 of the drum shell 27 to the extension of the tape housing 30, which line runs substantially parallel to the flat base portion 31 of the housing 30. This places the arcuate portion 26 in the upper rear quadrant III of the housing 30. As illustrated in FIG. 2, a portion of the arcuate portion 26 is also in the upper forward quadrant II of the housing 30.

The arcuate portion 26 preferably extends from the point 28 to a terminal point 32, formed by the intersection of a second imaginary line LL, which line LL extends from the center axis 29 of the drum shell 27 to the exterior of the tape housing 30. Line LL preferably forms an angle of at least 90° with Line L and more preferably at least about 120°, as illustrated in FIG. 1.

As further illustrated in FIGS. 1 and 2, the top section 10 is preferably positioned in the upper forward quadrant II of the tape measure, and the button 11 associated therewith faces generally upwardly in both the unlocked (FIG. 1) and locked (FIG. 2) position. Section 10 includes an upper surface 10a that slopes from the arcuate portion 26 downwardly at an angle to the vertical greater than 45° but less than 90°. In this embodiment that slope starts at a position adjacent arc 26 and 30° from the vertical in the second quadrant. This unique button placement in combination with the arcuate portion 26 permits the tape to be gripped more readily when in use, and greatly reduces the effort required to engage and disengage button 11 in order to lock and unlock the tape blade 23.

As further illustrated in FIG. 2, the locking button 11 is entirely positioned within quadrant II adjacent surface 10a. This is accomplished by extending portion of quadrant II outwardly and upwardly as illustrated. When the button 11 is thus oriented in quadrant II, the button may be engaged and disengaged with greater ease relative to prior locking systems, wherein the button resides wholly or partially within quadrant I. Thus, the arcuate section 26 in conjunction with the relocated button 1 provides for more convenient handling and operation of the tape and locking means relative to prior systems.

As shown in FIG. 1, 2 and 3, screw bosses are spaced about the perimeter of housing 30 to receive screws for securing the housing parts together. A first screw boss 50 is located beneath button 11, the second 52 is located adjacent lock shoe 20, and the third 54 is located in quadrant IV adjacent spool 56. The other half of housing includes holes which register with the bosses 50, 52 and 54 and permit insertion of screws, bolts or other fastening means for securing purposes.

The above is a detailed description of the preferred embodiment. The full scope of the invention is defined in the claims and their equivalents. In this regard the specification should not be interpreted to restrict unduly the invention beyond the scope entitled by the contribution to the prior art.

What is claimed is:

1. A tape measure comprising:
   (a) a housing having a flat base portion;
   (b) a drum shell within said housing having a central axis of rotation;
   (c) a tape blade wrapped about said drum shell with a portion exposed externally of said housing;
   (d) said drum shell arranged to rotate toward a dispensing disposition where said tape blade is drawn from said housing and retracting disposition where said tape blade is drawn into said housing about said drum;
   (e) said housing having four quadrants an upper forward quadrant, a lower forward quadrant, an upper rearward quadrant and a lower rearward quadrant, a portion of said housing having an arcuate portion extending over said upper rearward quadrant, said arcuate portion being located adjacent said drum;
   (f) locking means including a locking button located in said upper forward quadrant, an extension member extending from said button, a middle section, and a locking shoe, said middle section connected to said extension member by a first flexible hinge and connected to said locking shoe by a second flexible hinge;
   (g) an opening in said forward lower quadrant for permitting dispensing and retracting of said tape;
   (h) said housing having two upper lateral slots in opposed relationship and two lower vertical slots in opposed relationship, said extension member having two upper pins extending into each of said upper slots, and said lock shoe having lower pins extending into each of said lower slots;
   (i) said button being movable between a locked and unlocked position, said button, said extension member, said middle section, said locking shoe, said pins and said slots cooperating to retract said lock shoe from engagement with the tape when said button is moved to said unlocked position to permit relative rotational movement of said middle section relative to said extension, and when said button is in said locked position to engage said lock shoe with said tape to prohibit upward movement of said lock shoe and rotational movement of said middle section.

2. The tape measure according to claim 1 wherein said button, said extension, said middle section, said lock shoe and said first and second flexible hinges are integrally formed as a one piece element.

3. The tape measure according to claim 2 further comprising guide means for guiding vertical movement of said lock shoe.

4. The tape measure according to claim 3 wherein said housing has two parts and three separate fastening means for holding said parts together at locations spaced about said housing.

5. The tape measure according to claim 4 where said lock shoe includes compressibility means for deforming under compression by said tape.

6. The tape measure according to claim 5 wherein said compressibility means includes a number of spaced ribs.

7. A tape measure comprising:
   (a) a housing having an opening and a slot, said slot having side portions and end portions, said side portions being essentially without curvature;
   (b) a drum rotatably mounted in said housing;
   (c) a tape wound around said drum such that when said drum is rotated in a first direction said tape is unwound from said drum and dispensed through said opening; and
   (d) a tape locking mechanism for locking said tape, said locking mechanism including an actuating member and an elongated member extending from said actuating member toward said opening;
   (i) said actuating member being coupled to said housing for displacement from a first position to a second position; and
   (ii) said elongated member including a first portion that extends from said actuating member, a second portion that abuts against a portion of said tape when said actuating member is in said second position and a hinge that is spaced from said actuating member and positioned between said first and second portions to permit angular displacement of said first portion relative to said second portion, said second portion including a pin that extends into said slot such that said slot guides said pin and thus said second portion toward said portion of said tape when said actuating member is displaced from said first to said second position.

8. The tape measure of claim 7 wherein said actuating member is pivotally coupled to said housing.

9. The tape measure of claim 7 further including means for limiting lateral movement of said second portion relative to said unwound tape in said opening.

10. The tape measure of claim 7 wherein said hinge comprises a flexible plastic material.

11. The tape measure of claim 7 wherein said housing includes a second slot and said first portion includes a pin that extends into said second slot.

12. The tape measure of claim 11 wherein said second slot has an arcuate configuration.

13. The tape measure of claim 11 wherein said elongated member includes an intermediate portion and a second hinge, said intermediate portion having a first end and a second end, the first hinge coupling said first end to said first portion and said second hinge coupling said second end to said second portion.

14. The tape measure of claim 7 wherein said elongated member includes an intermediate portion and a second hinge, said intermediate portion having a first end and a second end, the first hinge coupling said first end to said first portion and said second hinge coupling said second end to said second portion.

15. The tape measure of claim 7 wherein said second portion includes means for permitting longitudinal compression of said second portion.

16. The tape measure of claim 15 wherein said means for permitting compression includes an opening that is formed in said second portion.

17. The tape measure of claim 15 wherein said means for permitting compression includes transverse slots that are formed in said second portion.

18. The tape measure of claim 7 wherein said housing includes a flat base portion and an arcuate section, said housing having four quadrants including a lower forward quadrant, an upper forward quadrant positioned directly above said lower forward quadrant, an upper rear quadrant positioned rearwardly of said upper forward quadrant and a lower rear quadrant positioned directly below said upper rear quadrant, said housing opening being positioned in said lower forward quadrant, and at least portion of said arcuate section being positioned in said upper rear quadrant.

19. The tape measure of claim 18 wherein said arcuate housing section is concentrically positioned about said drum.

20. The tape measure of claim 18 wherein said arcuate section extends through all of said upper rear quadrant and through a portion of said upper forward quadrant.

21. The tape measure of claim 20 wherein said actuating member is positioned entirely in said upper forward quadrant.

22. The tape measure of claim 21 wherein said quadrants are defined by a first plane parallel to said base portion and a second plane perpendicular to said first plane, both planes passing through the center axis of said drum.

23. The tape measure of claim 18 wherein said arcuate section defines an arc of at least 90 degrees.

* * * * *